United States Patent
Egli et al.

[11] 3,876,740
[45] Apr. 8, 1975

[54] PROCESS FOR IMPROVING INTERIOR SURFACE SMOOTHNESS AND GLOSS IN FOAMED TUBULAR EXTRUDATES BY THE USE OF EXTRUSION DIE FACES OF NOVEL GEOMETRY

[75] Inventors: Ernst Egli, Lichtensteig, Switzerland; Larry A. Thomas, Aurora, Ill.

[73] Assignee: Standard Oil Company, Chicago, Ill.

[22] Filed: Oct. 27, 1972

[21] Appl. No.: 301,526

[52] U.S. Cl. .............. 264/48; 264/54; 264/209; 264/DIG. 5; 264/DIG. 14; 425/380; 425/817 C
[51] Int. Cl. .............. B29d 27/00; B29f 3/06
[58] Field of Search ............ 264/51, 53, 54, 47, 48, 264/209, DIG. 5, DIG. 14; 425/4 C, 817 C, 380, 461, 467

[56] References Cited
UNITED STATES PATENTS

| 1,598,201 | 8/1926 | Koppitz | 425/380 X |
| 3,281,513 | 10/1966 | Stripp et al. | 264/48 X |
| 3,299,192 | 1/1967 | Lux | 264/48 |
| 3,304,580 | 2/1967 | Fochler | 425/380 |
| 3,308,509 | 3/1967 | Hsia | 425/380 |
| 3,391,051 | 7/1968 | Ehrenfreund et al. | 264/48 X |
| 3,488,746 | 1/1970 | Gilbert | 264/53 |
| 3,525,125 | 8/1970 | Berger et al. | 264/51 |
| 3,677,676 | 7/1972 | Hegler | 425/380 |
| 3,790,326 | 2/1974 | Larsen | 264/210 R X |
| 3,803,278 | 4/1974 | Eberle et al. | 264/209 X |

Primary Examiner—Philip E. Anderson
Attorney, Agent, or Firm—Reed F. Riley; Arthur G. Gilkes; William T. McClain

[57] ABSTRACT

Apparatus and method for reducing interior surface roughness and improving interior surface gloss in extruded tubular articles made from foamed thermoplastic materials.

8 Claims, 5 Drawing Figures

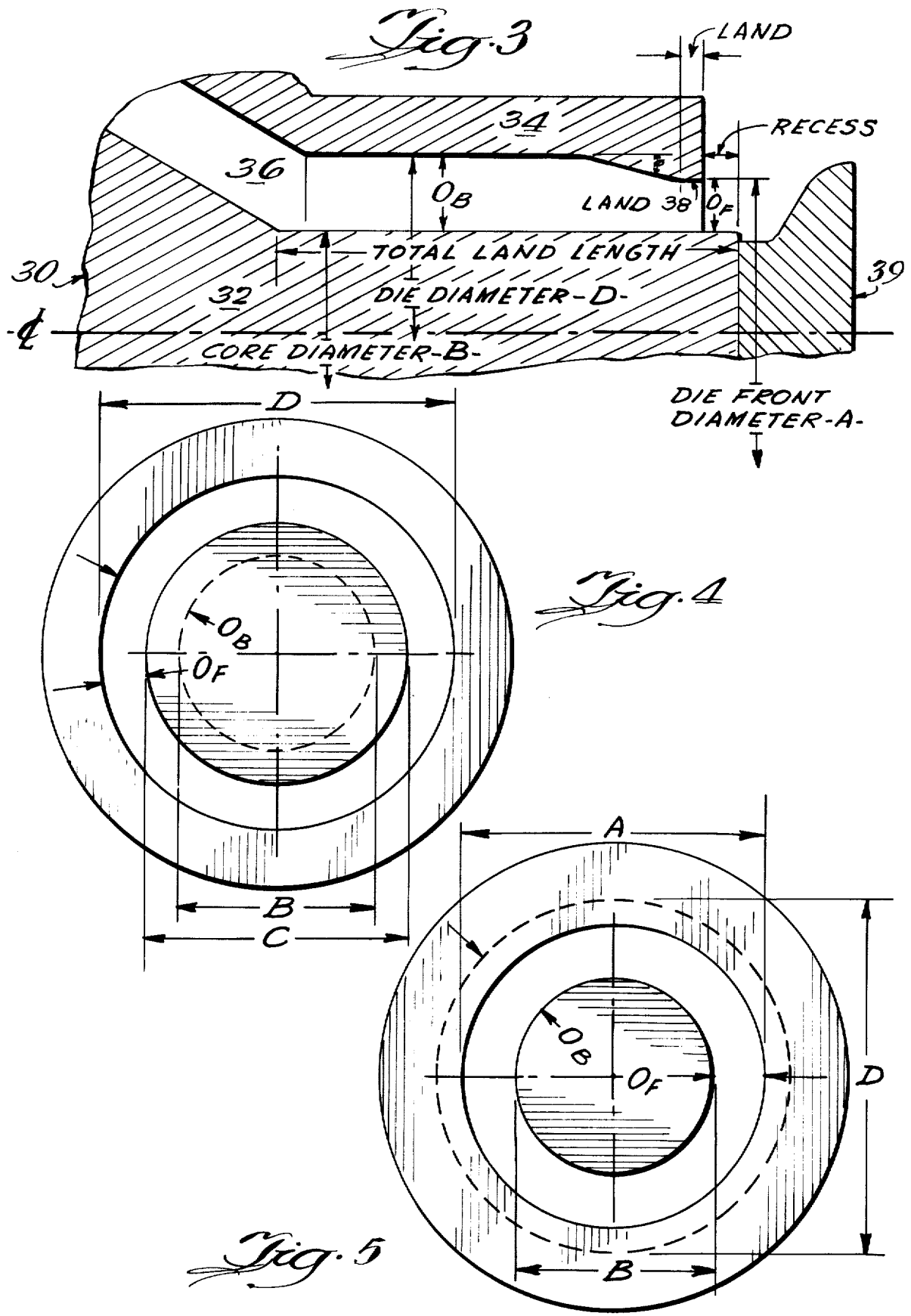

3,876,740

PROCESS FOR IMPROVING INTERIOR SURFACE SMOOTHNESS AND GLOSS IN FOAMED TUBULAR EXTRUDATES BY THE USE OF EXTRUSION DIE FACES OF NOVEL GEOMETRY

SUMMARY OF THE INVENTION

This invention relates to the production of tubular articles by the die extrusion of foamed thermoplastic material and, more particularly, to the production of tubular articles by die extrusion of foamed thermoplastic material wherein the interior surface of the foamed tubular article has improved smoothness and, for some thermoplastic materials, improved gloss; said improved smoothness and gloss originating from a novel arrangement of shaped restrictions placed on the exit face of the extrusion die.

BACKGROUND OF THE INVENTION

Hollow articles can be made from foamed thermoplastic material by die extrusion and such articles may weigh substantially less than equivalent non-foamed plastic articles. This saving of material can result in lower manufacturing costs provided that the foamed plastic articles satisfy all specifications for commercially salable items. Among such specifications are smoothness and gloss, particularly in connection with the inside surface of tubular articles prepared from foamed thermoplastic material.

Exit face die restrictions for extrusion of thermoplastic materials have been used in the past to increase the pressure drop across the exit face of the die, c.f., U.S. Pat. No. 3,427,371 and in particular U.S. Pat. No. 3,502,753. The 3,427,371 patent describes die restrictions for producing solid extrudates and the 3,502,753 patent uses die restrictions to keep the bubble size small in foamed thermoplastic parisons to improve the quality of the article blow-molded therefrom. The problem to which the instant invention is addressed is one related to the inside wall of a foamed tubular article. In particular, the problem was to produce a foamed tubular article of a density dictated only by the mechanical properties desired which, in addition and importantly for commercial usage, has as smooth an interior surface as possible and, additionally, if the thermoplastic material permits, as high a gloss on said interior surface as possible.

Now it has been found that the addition of certain properly shaped restrictions to the exit face of the extrusion die produces foamed tubular articles having substantially smoother inside surfaces than previously and, with certain thermoplastic materials, additionally, a higher gloss to said inside surfaces.

SUMMARY OF THE DRAWINGS

FIG. 3 is a longitudinal cross-section of the preferred embodiment of the die of FIG. 2. FIG. 3 shows the die of FIG. 2 followed by a mandrel. To obtain the complete die in each of the FIGS. 1, 2 and 3, a 360° rotation around the center line is required.

FIGS. 4 and 5 are transverse cross-sections of the dies of FIGS. 1 and 2, respectively. Further, it is generally true that in actual operation the die face is followed by a sizing sleeve (not shown in the Figures).

Before explaining the present invention in detail, it is to be understood that the invention is not limited in its application to the details of construction illustrated in the accompanying drawings, since the invention is capable of other embodiments and of being practiced or carried out in various ways. Also, it is to be understood that the phraseology or terminology employed herein is for the purpose of description and not of limitation.

STATEMENT OF THE INVENTION

The polymers useful in the instant invention are any thermoplastic materials which are foamable and are capable of exhibiting the proper mechanical properties when formed in foamed tubular shapes. More preferably, polyvinyl chloride, ABS, polystyrene, SAN, MBS and $C_2$ to $C_8$ polyolefins and copolymers thereof are used. Most preferably, polyvinyl chloride and polystyrene are employed in the instant invention.

In general, the foaming agent chosen depends upon the thermoplastic material used and the temperature used for extrusion. The amount of foaming agent chosen depends, inter alia, on the density of foamed plastic to be produced. In general, foamed tubular articles having a density reduction of from about 10 to about 50 percent are useful commercially, preferably about 10 to about 20 percent. A suitable foaming agent is azodicarbonamide, which is sold under the trade marks "Celogen AZ" and "Kempore" or Celogen OT which is p,p'-oxybis(benzene sulfonyl hydrazide). A larger number of suitable materials are given in the literature, and many such materials are listed in U.S. Pat. No. 3,186,207. In this connection it should be realized that the minimum quantity of blowing agent which will give the required density should be used as it has been found advantageous to utilize substantially all of said agent contained in the extrudate and also to have the expansion take place relatively quickly after the extrudate exits from the die face.

Temperature and pressure conditions used in the extruder attached to the die vary with the thermoplastic material used and are well known to those skilled in this art. In this connection, once a temperature profile is established for the extruder and die, care must be taken to insure that the decomposition temperature of the blowing agent used, if a chemical blowant is used, is enough below the maximum temperature used to produce proper foaming.

Figure 1:
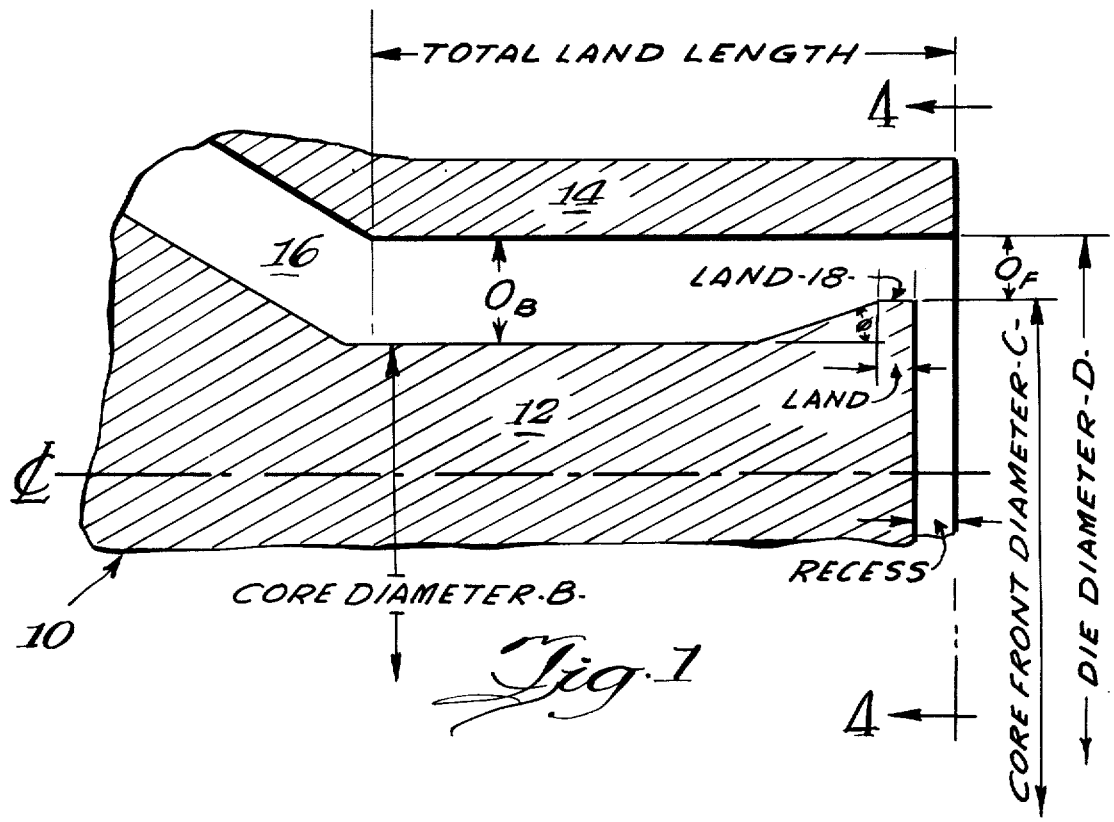
FIG. 1 is half of a longitudinal cross-section of an extrusion die, which is used to carry out the method of this invention using the thermoplastic, polystyrene.

Referring now to FIG. 1, the die 10 is composed of an inner portion 12 and an outer portion 14 which when arranged as shown form the cylindrical annular opening 16 through which the thermoplastic material admixed with a blowing agent is forced at elevated pressure and temperature. Further, it may be seen that the inner portion 12 is recessed from the plane of the orifice as defined by the exit face of 14 and, in addition, is tapered radially inward towards the outer portion 14 at an angle of about 5° to about 40°, preferably about 5° to about 20° and, most preferably, about 5 to about 15 degrees, ending in the land 18. Construction of the orifice plus the recessed portion of the die are both necessary to give best results, but either one alone will result in some improvement in the degree of smoothness of the interior surface of the foamed tubular article being extruded. The amount of recess and land length may be the same or different dimensions, but preferably they are the same size. While the dimensions B, C and D are not critical to produce smooth inside surfaces once a thermoplastic material and density of the foamed tubular article are chosen, these variables determine the wall thickness and diameter of the tubular article. FIG. 4 shows a transverse cross-section of the die of FIG. 1. Although the orifice of the die of FIGS. 1 and 4 is circular, the invention described herein should not be so limited. Some values for various size foamed polystyrene pipe made using a vacuum type sizing sleeve are given in the Table below.

TABLE

DIE DIMENSIONS FOR POLYSTYRENE FOAM SEWER PIPE AND CONDUIT (APPARENT DENSITY .91 GR/CM³)*, **

| SIZE | STANDARD WALL W | SIZING SLEEVE DIAMETER | B | C | D | $O_F$ | $O_R$ |
|---|---|---|---|---|---|---|---|
| PS Foam Sewer Pipe | | | | | | | |
| 2" Non-perforated | .090 | 2.290 | 2.002 | 2.076 | 2.200 | .062 | .099 |
| 3" Non-perforated | .106 | 3.296 | 2.936 | 3.024 | 3.170 | .073 | .117 |
| 3" Perforated | .085 | 3.296 | 2.982 | 3.052 | 3.170 | .059 | .094 |
| 4" Non-Perforated | .132 | 4.265 | 3.810 | 3.920 | 4.100 | .090 | .145 |
| 4" Perforated | .094 | 4.265 | 3.894 | 3.972 | 4.100 | .064 | .103 |
| 6" Non-perforated | .193 | 6.330 | 5.656 | 5.816 | 6.080 | .132 | .212 |

* All dimensions in inches.
** Angle ϕ is 10°, recess is 0.050 inches, land is 0.050 inches and total land length is 4 inches for all dies herein.

Figure 2:
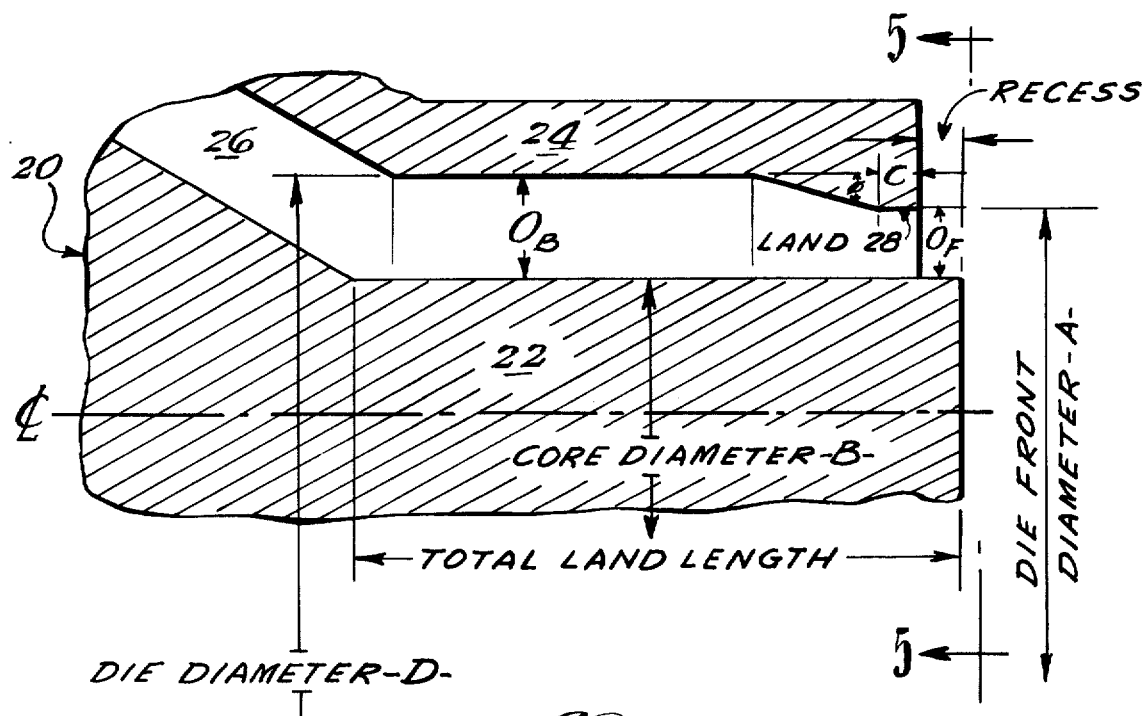
FIG. 2 is half of a longitudinal cross-section of an extrusion die of the instant invention used for the thermoplastic, polyvinyl chloride.

Referring now to FIG. 2, the die 20 is composed of an inner portion 22 and an outer portion 24 which when arranged as shown form the cylindrical annular opening 16 through which the thermoplastic material admixed with blowing agent is forced at elevated temperature and pressure. In contrast to the die of FIG. 1, it may be seen that the outer portion 24 of the die 20 rather than the inner portion 22 is recessed from the plane of the orifice, now defined as the exit face of 22 and, in addition, is tapered radially inward towards 22 at a small angle of about 5° to about 40°, more preferably, about 5° to about 30°, and most preferably, about 5° to about 15°, ending in the land 28. Constriction of the orifice plus the recessed portion of the die are both necessary to give best results, but either one alone will result in some improvement in the degree of smoothness of the interior of the foamed tubular articles being extruded. The amount of recess and land length may be the same or different dimensions but preferably they are the same size. In the configuration show in FIG. 2, the dimensions A, B and D are not critical for smoothness but are chosen, once a thermoplastic material and density of the foamed article are selected, to produce a given wall thickness and diameter. FIG. 5 shows a transverse cross-section of the die of FIG. 2. Although the orifices of the dies shown in FIGS. 2, 3 and 5 are circular, the invention herein described should not be construed as so limited.

FIG. 3 shows a preferred embodiment of the die of FIG. 2 in which the inner portion 32 of the die is followed by a tapered-outward mandrel 39. As shown, extension 39 begins at the exit face of 32 at a smaller diameter than 32 and then tapers outward to form a mandrel over which the extruded tubular article is pulled. The addition of such mandrel has been shown to improve the inside surface smoothness of polyvinyl chloride pipe as made by the die of FIG. 2.

As shown in the Figures each restriction ends in a land which is parallel to the opposing die surface. Although best results are obtained thereby with the thermoplastic materials used to illustrate the invention, some improvement in interior wall smoothness is obtained where the land length is zero, i.e., a knife edge restriction and said improvement increases when the portion containing the restriction is recessed.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

EXAMPLE I

Polyvinyl chloride pipe was extruded from a die of the general design shown in FIG. 2 using a conventional extruder and a vacuum sizing sleeve. In one case, a pipe density of 0.73 was obtained by using 0.1 weight percent Celogen AZ and 0.1 weight percent Celogen OT as a blowing agent. In another case, pipe of density 0.62 was made using commercially available Vycel brand polyvinyl chloride containing an unknown kind and amount of blowing agent. The pipe interior surface in the first case was smooth and the interior surface of the pipe in the Vycel case was very rough. Most likely, the roughness in the Vycel pipe was caused by its different melt behavior (viscosity strength) as compared to polyvinyl chloride material wherein the nature and amount of blowing agent was known.

The comparison as to smoothness for each pipe sample made in Examples I and II were with pipe made from a die having knife edge restrictions on both inner and outer portions of the die and no recessed portion.

When a mandrel was added extending the inner portion of the die as in FIG. 3 and polyvinyl chloride pipe extruded at a density of 0.75 using 0.1 weight percent OT and 0.1 weight percent AZ, the degree of smoothness of the inside wall increased.

When a die of the configuration of FIG. 1 was used to make polyvinyl chloride pipe of density 0.81 using 0.1 weight percent OT and 0.1 weight percent AZ some improvement in smoothness was noted.

Using a die having a recessed, knife edge orifice restriction on the inner portion of the die to produce polyvinyl chloride pipe of density 0.72 using 0.1 weight percent OT and 0.1 weight percent AZ gave only some improvement in smoothness. Die dimensions were the same as those quoted in the paragraph below for the die of the configuration of FIG. 1.

For each die in this Example having the configuration of FIG. 2, "B was 0.129 inches, "F was 0.076 inches, the recess was 0.25 inches and the land was 0.25 inches. For the die used of the configuration of FIG. 1, "B was 0.129 inches, "F was 0.075 inches, the recess was 0.125 inches and the land was 0.25 inches.

EXAMPLE II

A die of the configuration shown in FIG. 1 was used to extrude polystyrene pipe of density 0.87 using 0.05 weight percent AZ. Very smooth interior pipe with some gloss was obtained.

Polystyrene pipe of density 0.74 using 0.1 weight percent AZ was made with a die having a recessed knife edge orifice restriction on the inner portion of the die and some improvement in interior wall smoothness was noted.

What is claimed is:

1. A process for making a tubular article of improved interior wall smoothness which comprises extruding a heated mixture of polystyrene and a blowing agent under pressure through an annular opening of an extrusion die wherein said die is composed of an inner portion and an outer portion together forming said annular opening, said inner portion being recessed from the exit face of said die, and wherein the orifice of said annular opening contains a restriction formed on said inner portion comprising a tapered projection which extends radially into said annular opening so that said orifice is of reduced cross-section relative to the remainder of said annular opening.

2. The process of claim 1 wherein said tapered projection ends in a land.

3. The process of claim 2 wherein said land is in size equal to the amount of recess.

4. The process of claim 3 wherein said land and amount of recess are 0.05 inches.

5. A process for making a tubular article of improved interior wall smoothness which comprises extruding a heated mixture of polyvinyl chloride and a blowing agent under pressure through an annular opening of an extrusion die wherein said die is composed of an inner portion and and outer portion together forming said annular opening, said outer portion being recessed from the exit face of said die, and wherein the orifice of said annular opening contains a restriction formed on said outer portion comprising a tapered projection which extends radially into said annular opening so that said orifice is of reduced cross-section relative to the remainder of said annular opening.

6. The process of claim 5 wherein said tapered projection ends in a land.

7. The process of claim 6 wherein said land is in size equal to the amount of recess.

8. The process of claim 7 wherein said land and amount of recess are 0.25 inches.

* * * * *